(12) United States Patent
Holl

(10) Patent No.: US 8,573,039 B2
(45) Date of Patent: Nov. 5, 2013

(54) COMPRESSION TEST ADAPTER

(75) Inventor: Richard Holl, Parma, OH (US)

(73) Assignee: Service Solutions U.S. LLC, Warren, MI (US)

( * ) Notice: Subject to any disclaimer, the term of this patent is extended or adjusted under 35 U.S.C. 154(b) by 43 days.

(21) Appl. No.: 12/896,267

(22) Filed: Oct. 1, 2010

(65) Prior Publication Data
US 2012/0079877 A1    Apr. 5, 2012

(51) Int. Cl.
   *G01M 15/02*    (2006.01)
(52) U.S. Cl.
   USPC ....................................... 73/114.16
(58) Field of Classification Search
   USPC ....................................... 73/114.16
   See application file for complete search history.

(56) References Cited

U.S. PATENT DOCUMENTS

| | | | | | |
|---|---|---|---|---|---|
| 1,657,047 | A | * | 1/1928 | St John | 73/756 |
| 2,862,386 | A | * | 12/1958 | Campbell et al. | 73/756 |
| 3,100,988 | A | * | 8/1963 | Mansfield | 73/114.18 |
| 3,224,260 | A | * | 12/1965 | Lankford | 73/756 |
| 3,320,801 | A | * | 5/1967 | Rhindress, Jr. | 73/114.18 |
| 3,600,941 | A | * | 8/1971 | Kammeraad | 73/114.18 |
| 3,779,081 | A | * | 12/1973 | Holtzman | 73/744 |
| 3,979,960 | A | * | 9/1976 | Schwartz | 73/744 |
| 5,756,888 | A | * | 5/1998 | Marquez-Escoto | 73/114.18 |
| 6,968,733 | B2 | * | 11/2005 | Andreasen et al. | 73/114.18 |
| 7,216,531 | B2 | | 5/2007 | Young et al. | |
| 2006/0243038 | A1 | * | 11/2006 | Young et al. | 73/116 |
| 2010/0011847 | A1 | | 1/2010 | Slivon et al. | |

OTHER PUBLICATIONS

Snap-on model EEPV307A 12mm Adaptor Assembly; Photos of Snap-on model EEPV307A were taken around Feb. 25, 2010.
Snap-on model EEPV307A 12mm Adaptor Assembly; http://buy1.snapon.com/catalog.

* cited by examiner

*Primary Examiner* — Freddie Kirkland, III
(74) *Attorney, Agent, or Firm* — Baker Hostetler LLP

(57) ABSTRACT

A compression tester adapter is provided. The compression adaptor includes a generally cylindrical plug fitting, including a pilot segment, an external thread, a cylinder segment, a gasket located between the external thread and the cylinder segment and a plug end; and a connector fitting including an attachment interface; and a hose attached to the plug fitting. A method of adapting a compression tester spark plug hose for use with a spark plug socket is provided. The method includes; engaging a threaded spark plug socket in an internal combustion engine cylinder head; attaching a compression tester spark plug hose; and transmitting a compressed gas to the compression tester spark plug hose wherein the spark plug socket thread is configured with a nominal diameter of 12 millimeters; and creating a substantially airtight seal against a periphery of a tapered seat near a inner extreme of the spark plug socket.

20 Claims, 3 Drawing Sheets

COMPRESSION TEST ADAPTER

FIELD OF THE INVENTION

The present invention relates generally to engine diagnostics. More particularly, the present invention relates to internal combustion engine cylinder compression testers.

BACKGROUND OF THE INVENTION

Compression testers are used to measure the compression pressure in an individual cylinder of an internal combustion engine. A typical compression tester consists of a compression pressure gauge with a pressure measurement range of, for example, 0-300 pounds per square inch (psig), and a compression pressure hose assembly that attaches to the compression pressure gauge. Typically, the compression tester hose assembly connects to a spark plug socket in an engine cylinder head. Thus, the spark plug is removed from the cylinder head, and the compression tester hose assembly is threaded into the spark plug hole, or socket, in order to establish fluid communication between the compression pressure gauge and the engine cylinder. The engine is then cranked for several revolutions, typically using the engine starter, in order to measure the maximum compression pressure in the engine cylinder.

The compression pressure is used to test internal combustion engines for proper compression in each cylinder. Improper compression can cause rough idling or running, backfiring and poor fuel economy. Low compression in a cylinder can be an indication of worn or damaged piston rings, valves, head gasket or timing chain. A high compression reading may indicate carbon buildup in the cylinder. If the compression pressure gauge remains at the same value for several strokes and then begins to climb, the cylinder may have a sticking valve.

Standard spark plug sockets typically include 14-millimeter (mm) nominal threads, 18-mm nominal threads, 12-mm nominal threads or 10-mm nominal threads. However, some newer engines utilize other spark plug thread sizes. For example, the Ford Triton™ three-valve V8 engine family utilizes 12-mm nominal threads.

SUMMARY OF THE INVENTION

The foregoing needs are met, to a great extent, by the present invention, wherein in one aspect an apparatus is provided that in some embodiments facilitates compression testing of an engine that includes 12-mm nominal spark plug sockets.

In accordance with another embodiment of the present invention, a compression tester adapter is provided. The compression adaptor includes a generally cylindrical plug fitting, including a flange segment, an external thread, a cylinder segment, a gasket located between the external thread and the cylinder segment and a plug end; and a connector fitting including an attachment interface; and a hose attached to the plug fitting.

In accordance with another embodiment of the present invention, a compression tester adapter is provided. The compression adaptor includes means for engaging a threaded spark plug socket in an internal combustion engine cylinder head; means for attaching a compression tester spark plug hose; flexible means for transmitting a compressed gas; means for affixing the flexible means for transmitting to the means for engaging; means for affixing the flexible means for transmitting to the means for attaching wherein the means for engaging is configured to engage an internal thread configured with a nominal diameter of 12 millimeters; and means for creating a substantially airtight seal against a periphery of a tapered seat near a inner extreme of the spark plug socket.

In accordance with yet another embodiment of the present invention, a method of adapting a compression tester spark plug hose for use with a spark plug socket is provided. The method includes; engaging a threaded spark plug socket in an internal combustion engine cylinder head; attaching a compression tester spark plug hose; and transmitting a compressed gas to the compression tester spark plug hose wherein the spark plug socket thread is configured with a nominal diameter of 12 millimeters; and creating a substantially airtight seal against a periphery of a tapered seat near a inner extreme of the spark plug socket.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 3 illustrates the internal passages.

DETAILED DESCRIPTION

Figure 1:
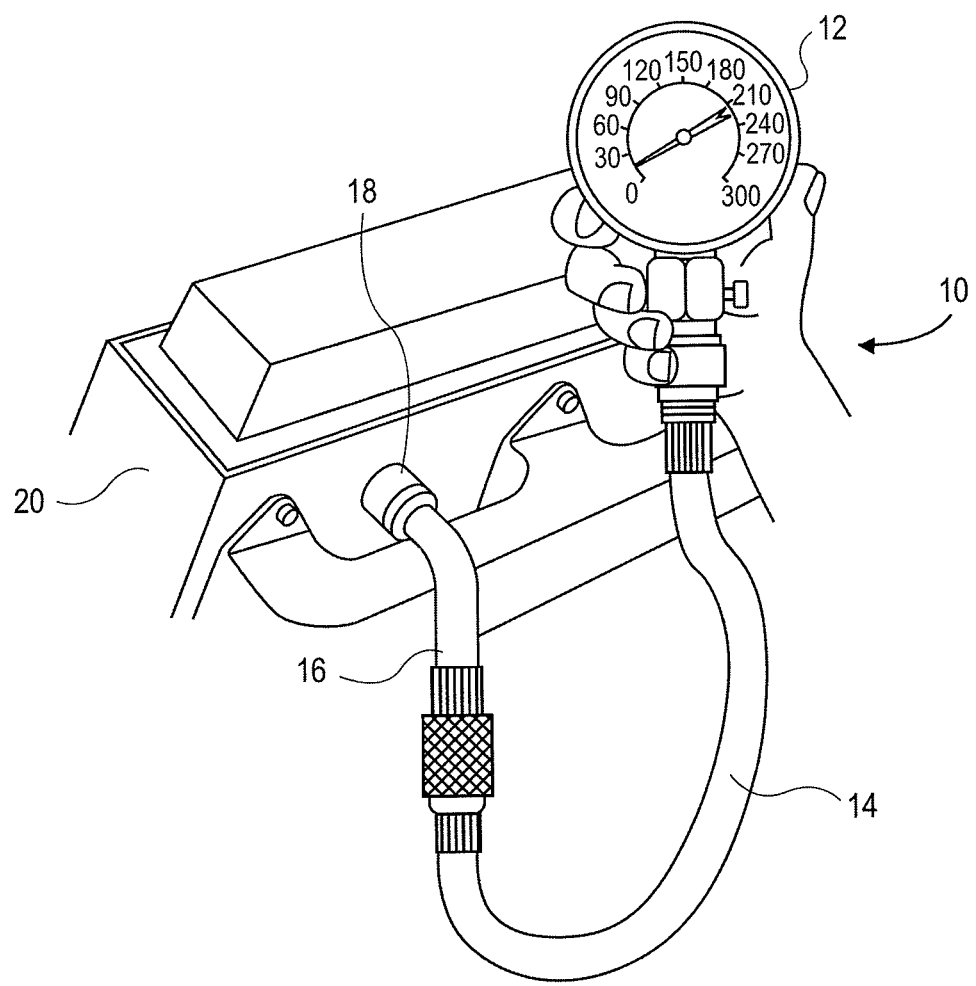
FIG. 1 illustrates an exemplary compression tester configuration including a compression tester adapter according to a preferred embodiment of the invention.

The invention will now be described with reference to the drawing figures, in which like reference numerals refer to like parts throughout. An embodiment in accordance with the present invention provides a compression tester adapter to adapt a standard compression tester hose assembly for connection to 12-millimeter (mm) nominal threaded spark plug socket. The compression tester adapter includes a plug fitting, a connector fitting, and a flexible hose connected to the plug fitting and to the connector fitting, providing uninterrupted sealed fluid communication between an orifice in the plug fitting and an attachment interface on the connector fitting.

An embodiment of the present inventive apparatus and method is illustrated in FIG. 1. FIG. 1 shows a compression tester 10 including a compression pressure gauge 12, a compression tester hose assembly 14 and a compression tester adapter 16. The compression tester adapter 16 allows the standard compression tester hose assembly 14 to be connected to a spark plug socket 18 with 12-mm nominal threads in an internal combustion engine cylinder head 20.

The compression tester adapter 16 and the compression tester hose assembly 14 permit connection of the compression pressure gauge 12 to the cylinder head 20 in order to provide fluid communication between a cylinder in the engine and the compression pressure gauge 12. Thus, when the engine is cranked through, typically, three or more revolutions, the compression pressure gauge 12 senses the maximum compression pressure developed in the engine cylinder. A typical compression pressure gauge 12 is capable of measuring pressures in a range, for example, from 0-300 psig.

Figure 2:
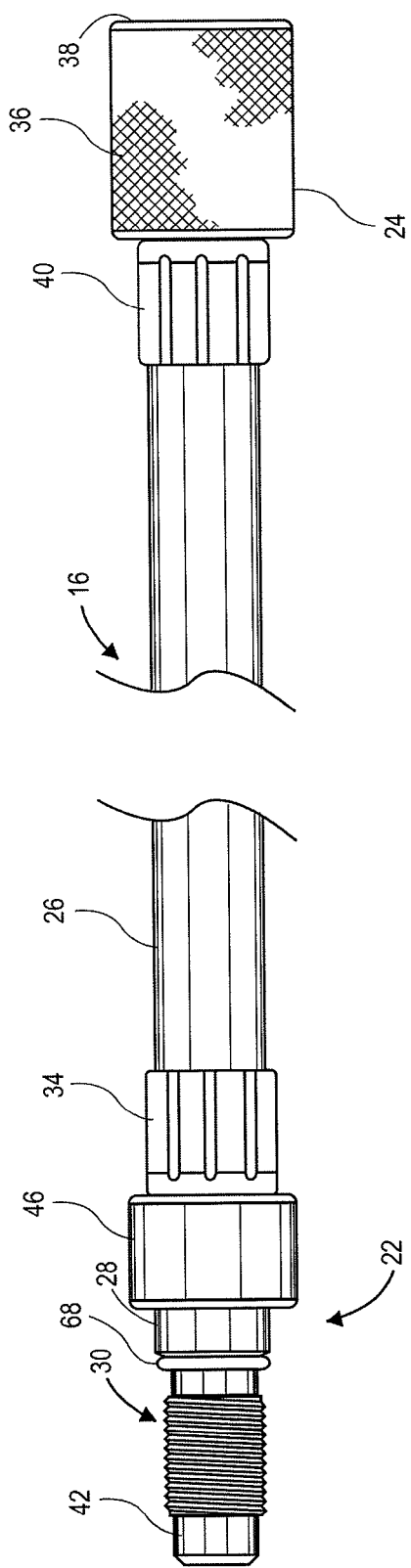
FIG. 2 is a side view illustrating the compression tester adapter of FIG. 1.
Figure 3:
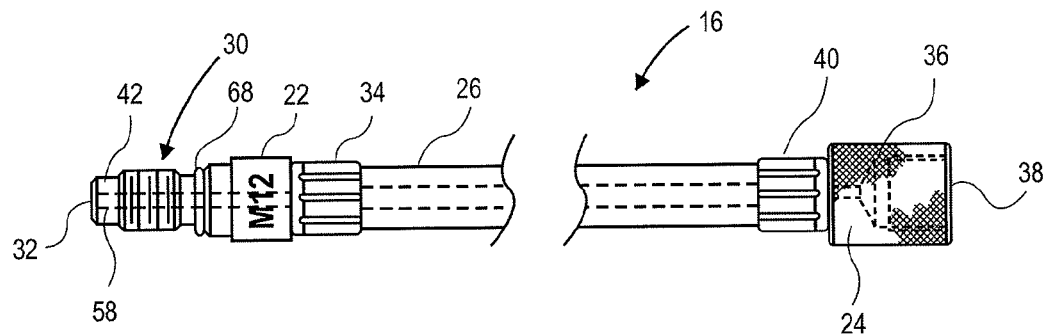
FIG. 3 is a side view similar to FIG. 2, however.

An embodiment of the compression tester adapter 16 is shown in FIGS. 2 and 3. The compression tester adapter 16 includes a plug fitting 22 and a connector fitting 24, which are connected to the two ends of a flexible hose 26. In an embodiment of the invention, the flexible hose 26 is approximately 4.31 inches in length, permitting access to a spark plug socket located at the bottom of a relatively deep spark plug well, for example, greater than two inches deep. This configuration has the advantage that a compression tester 10 (see FIG. 1) can be adapted to reach the spark plug socket 18 in, for example, a Ford Triton™ three-valve engine, including the 4.6 liter and 5.4 liter V8 versions.

As shown in FIGS. 2 and 3, the compression tester adapter 16 plug fitting 22 includes a cylinder segment 42 with external threads 30 configured to engage 12-mm nominal size internal threads, and an orifice 32 to permit entry of compressed air from an engine cylinder into the compression tester adapter 16. The plug fitting 22 is fixedly attached to the flexible hose 26 using a crimped ferrule 34.

The compression tester adapter 16 also includes a connector fitting 24, which has a diamond knurl 36 on its exterior surface to aid in manual rotation of the compression tester adapter 16 in order to thread the plug fitting 22 into a spark plug socket 18 (see FIG. 1). The connector fitting 24 is fixedly attached to the flexible hose 26 with a crimped ferrule 40, and includes an attachment interface 38. In some embodiments of the invention, the attachment interface 38 includes internal threads, for example, 14-mm or any other sized nominal threads. The attachment interface 38 permits attachment of the compression tester adapter 16 to a standard compression tester hose assembly 14 (see FIG. 1), such as those included with the OTC Models 5605 and 5606, and the Actron® Models CP7828 and CP7827, manufactured by SPX Corporation of North Carolina, U.S.A.

Figure 4:
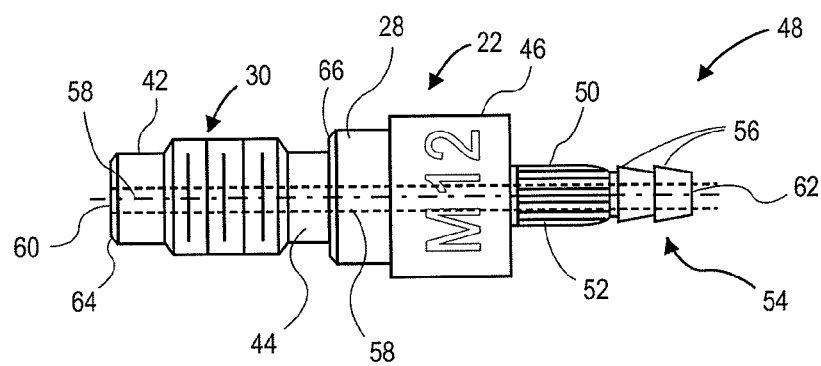
FIG. 4 is a side view of a plug fitting that is compatible with the compression tester adapter of FIG. 2.

FIG. 4 illustrates a plug fitting 22 in accordance with an embodiment of the invention. The plug fitting 22 includes a pilot segment 42 near the plug end that is inserted into the spark plug socket 18 (see FIG. 1). The pilot segment 42 provides a guide surface to center the plug fitting 22 in a spark plug socket. The plug fitting 22 also includes a gasket seat 44 with the same, larger or smaller diameter than that of the pilot segment 42 between the threads 30 and a cylinder segment 28.

In one example embodiment, plug fitting 22 includes a pilot segment 42 with a diameter of approximately 0.375 inch, a gasket seat 44 with a diameter of approximately 0.39 inch, and a cylinder segment 28 with a diameter of approximately 0.55 inch. In this example embodiment, the pilot segment 42 is approximately 0.21 inch wide with a 0.03 inch 45° chamfer 64 at the plug end, the gasket seat 44 is approximately 0.156 inch wide, and the cylinder segment 28 is approximately 0.25 inch wide with a 0.03 inch 45° chamfer 66 at its plug end. (Alternatively, these widths could be referred to as axial lengths.)

A 12-mm nominal metric external thread 30, or threads, which may be configured generally in compliance with International Standards Organization (ISO). Specifications may be machined into the external surface of the rim segment 46. The plug fitting 22 also includes a rim segment 46 with a larger diameter than that of the cylinder segment 28. At the end of the plug fitting 22 opposite the pilot segment 42 is a tube end 48 of the plug fitting 22, which includes a tube segment 50 and a hose connector segment 54. The tube segment 50 includes a straight knurl 52 and the hose connector segment 54 includes a serration profile 56, which aid in attaching the flexible hose 26 (see FIG. 2) to the plug fitting 22.

The plug fitting 22 further includes an internal airway 58, comprising a cylindrical bore, for example, of 0.110 inch diameter, through the center of the plug fitting 22 along its longitudinal axis with an orifice 60 at the plug, or pilot, end and an opening 62 at the tube end 48. The plug end of the pilot segment 42 and the cylinder segment 28 are machined with chamfered edges 64, 66 to prevent damage to the plug fitting 22 or to the spark plug socket threads when the plug fitting is inserted into the spark plug socket.

The plug fitting is configured to accommodate a gasket 68 at the gasket seat 44 to seal against a tapered edge at the bottom of the spark plug socket 18 (see FIG. 1). The gasket 68 is retained by the threads 30 and the cylinder segment 28. In one embodiment, the plug fitting 22 includes an O-ring type gasket 68 made from a resilient material that conforms to the gasket seat 44 surface, such as a natural or artificial rubber, or an elastomer, which provides for an air tight seal against the tapered bottom edge of the spark plug socket 18 to facilitate measurement of the maximum compression pressure developed in the engine cylinder.

The 12-mm nominal external threads 30 on the plug fitting 22 shown in FIG. 4 have a pitch diameter, a crest or external diameter, or a root or internal diameter of approximately 12-mm and a shape similar to that of the threads on a spark plug. However, the precise diameter and shape of the external threads 30 on the plug fitting 22 depend on the specification or standard required by the design of the compression tester adapter in order to mate with the threads of a particular spark plug socket adapter 18 (see FIG. 1). In embodiments of the invention, the external threads 30 of the plug fitting 22 are configured in accordance with the International Standards Organization (ISO) specifications. Other embodiments of the invention may include variations of this thread standard or another 12-mm nominal thread standard. The compression tester adapter facilitates the use of an existing compression tester with an engine including a 12-mm nominal spark plug socket, such as the Ford Triton™ three-valve V8 engine family.

Figure 5:
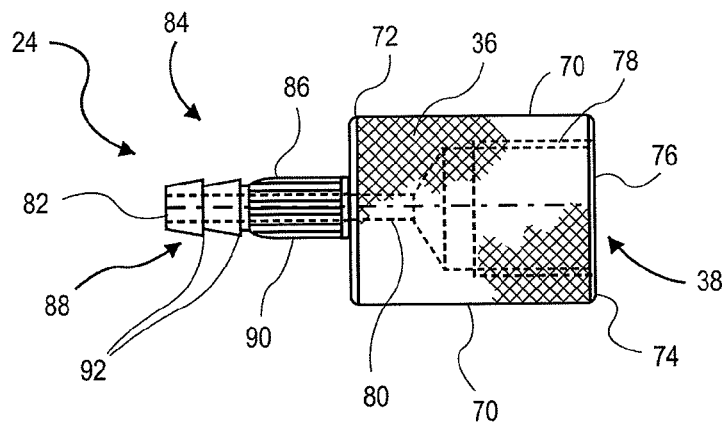
FIG. 5 is a side view of a connector fitting that is compatible with the compression tester adapter of FIG. 2.

An embodiment of the connector fitting 24 is illustrated in FIG. 5. The connector fitting 24 includes a cylinder segment 70 with a diamond knurl 36 machined on the external surface of the cylinder segment 70. The cylinder segment 70 includes a chamfered edge at each end 72, 74. Some embodiments of the invention include a socket 76 with internal threads 78 to provide an attachment interface 38.

Some embodiments of the compression tester adapter include a connector fitting 24 with internal threads 78 configured in accordance with the International Standards Organization (ISO) specifications. Various embodiments of the compression tester adapter include an attachment interface 38 or socket 76 with different sized standard threads, for example, 14-mm nominal threads.

The socket 76 opens into an internal airway 80, comprising a cylindrical bore, for example, of 0.110 inch diameter, through the center of the connector fitting 24 along its longitudinal axis with an opening 82 at the opposite or tube end of the connector fitting 24. At this end of the connector fitting 24 is a tube end 84 comprising a tube segment 86 and a hose connector segment 88. The tube segment 86 includes a straight knurl 90 and the hose connector segment 88 includes a serration profile 92, which aid in attaching the flexible hose 26 (see FIG. 2) to the connector fitting 24.

Although the connector fitting 24 shown in FIG. 5 includes a socket 76 with internal threads 78, the attachment interface 38 of the connector fitting 24 in other embodiments may include any suitable connector interface, for example, a quick-disconnect coupling connector of the type used on some existing compression tester assemblies, such as the Actron™ Models CP7828 and CP7827 manufactured by SPX Corporation of North Carolina, U.S.A.

In an embodiment of the compression tester adapter, the plug fitting and the connector fitting are machined from cold-rolled carbon steel, and include a bright nickel plate finish. However, in other embodiments these fittings may include any suitable material, such as brass, cast iron, or the like.

Referring again to FIG. 2, the flexible hose 26 includes a hollow central passage of generally cylindrical shape along the longitudinal axis of the flexible tube 26 to transmit compressed air from the plug fitting 22 to the connector fitting 24, and thus to the compression pressure gauge 12 (see FIG. 1). The compression tester adapter provides a continuous uninterrupted sealed, or airtight, fluid communication path between the orifice 32 in the plug fitting 22 and the attachment interface 38 of the connector fitting 24.

The plug fitting 22 and the connector fitting 24 are attached to the flexible hose 26 by inserting the tube ends 48, 84 (see FIG. 4 and FIG. 5) into both ends of the flexible hose 26 and crimping steel ferrules 34, 40 over the exterior of the flexible hose 26 to compress the flexible hose 26 over the tube ends 48, 84 (see FIG. 4 and FIG. 5). Thus, the connector fitting 24 and the plug fitting 22 are fixedly attached to the flexible hose 26 so that the plug fitting 22 can be threaded into a spark plug socket by manually rotating the compression tester adapter by way of the diamond knurl 36 exterior surface of the connector fitting 24. The various embodiments including a flexible hose 26 have the advantage that the compression tester adapter can be installed in a spark plug socket that is not accessible with a straight, rigid, one-piece adapter fitting.

The flexible hose 26 is made of an oil- and grease-resistant material, such as a natural or artificial rubber, or polymer, and includes one or more internal reinforcement sleeves including a braid or mesh oriented on the bias, that is, approximately at a 45-degree diagonal with respect to the longitudinal axis of the flexible tube 26. A preferred embodiment of the invention includes two textile braid reinforcements between an inner tube of seamless nitrile rubber and an outer jacket of neoprene. An alternative embodiment includes two metallic mesh reinforcement sleeves. Other embodiments may include any suitable reinforcement sleeve configurations, including one or more textile or metallic braid or mesh reinforcement sleeves. In some embodiments the textile or metallic braid or mesh may be oriented at a different orientation, for example, parallel to the longitudinal axis of the flexible tube 26 or at a different angle, for example, at a 30-degree angle with the longitudinal axis of the flexible tube 26. Furthermore, another alternative embodiment of the invention includes a flexible hose made of a single flexible material and does not include a reinforcement sleeve.

The various embodiments of the invention that include a textile or metallic braid or mesh reinforcement sleeve, or multiple reinforcement sleeves, have the advantage that the reinforcement sleeve transfers the torque or moment placed upon the connector fitting 24 when the diamond knurl 36 exterior surface is rotated in order to thread the plug fitting 22 external threads 30 into a spark plug socket. Thus, the reinforcement sleeve carries the majority of the torque or moment loading when the compression tester adapter is tightened into or loosened from a spark plug socket.

An alternative embodiment of the invention includes a plug fitting end and a connector fitting end machined from a single metal stock. In this embodiment, one end of the compression tester adapter 16 is configured with the features described above for on the plug fitting 22 of FIG. 4, except for the tube end 48, which is not included; the opposite end is configured with the features described above for the connector fitting 24 of FIG. 5, except for the tube end 84, which is not included. Thus, this embodiment does not include a flexible hose, but rather comprises a single, rigid, machined fitting with a plug end and a connector end.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A compression tester adapter, comprising:
   a generally cylindrical plug fitting, including a pilot segment, an external thread, a cylinder segment, a plug end and a gasket located between the external thread and the cylinder segment, wherein the gasket is mounted on a cylinder portion having about the same diameter as the pilot segment;
   a connector fitting including an attachment interface; and
   a hose attached to the plug fitting.

2. The compression tester adapter of claim 1, wherein the external thread has a nominal diameter of 12 mm.

3. The compression tester adapter of claim 1, wherein the plug fitting further includes the pilot segment near the plug end with a pilot diameter that is smaller than a cylinder segment diameter.

4. The compression tester adapter of claim 1, wherein the plug fitting further includes a gasket seat between the cylinder segment and the external thread, the gasket seat having a diameter that is about the same as a flange diameter.

5. The compression tester adapter of claim 1, wherein the plug fitting is configured to form a seal against a periphery of a tapered seat near an inner extreme of a spark plug socket in an internal combustion engine cylinder head.

6. The compression tester adapter of claim 1, wherein the plug fitting further includes: a first tube end opposite the plug end, wherein the hose is attached to the plug fitting at the first tube end; and a first airway configured to allow fluid communication through the plug fitting between the plug end and the first tube end.

7. The compression tester adapter of claim 6, wherein the plug fitting further includes an orifice at the plug end configured to provide access to the first airway.

8. The compression tester adapter of claim 6, wherein the plug fitting further includes a hose connector at the first tube end configured to engage an inner surface of the hose, the hose connector including a tube segment with a straight knurl and an external serration profile segment.

9. The compression tester adapter of claim 6, wherein the plug fitting further includes an opening at the first tube end providing access to the first airway, the opening being configured to allow fluid communication between the plug fitting and the hose.

10. The compression tester adapter of claim 1, wherein the plug fitting further includes a rim segment with a rim diameter that is larger than a cylinder segment diameter.

11. The compression tester adapter of claim 1, wherein the attachment interface includes a socket configured with an internal thread on an inner surface of the socket.

12. The compression tester adapter of claim 1, wherein the connector fitting attachment interface is configured to engage a compression tester quick-disconnect coupling.

13. The compression tester adapter of claim 1, further comprising: a first ferrule configured to engage an outer surface of the hose; and a second ferrule configured to engage the outer surface of the hose, wherein the first ferrule is crimped onto a first hose end of the plug fitting to affix the hose to the plug fitting, and the second ferrule is crimped onto a second hose end of the connector fitting to affix the hose to the connector fitting.

14. The compression tester adapter of claim 1, wherein the plug fitting further includes:
an attachment end;
a tube end, wherein the hose is attached to the connector fitting at the tube end; and
an airway configured to allow fluid communication through the connector fitting between the attachment end and the tube end.

15. The compression tester adapter of claim 1, wherein the connector fitting is generally cylindrical in shape and further includes:
a cylinder segment at the attachment end with an external diamond knurl;
a socket in the cylinder segment that opens into an airway;
an internal thread on an inner surface of the socket;
a hose connector at a tube end configured to engage an inner surface of the hose including a tube segment with a straight knurl and an external serration profile segment; and
an opening at the tube end providing access to the airway, the opening being configured to allow fluid communication between the connector fitting and the hose.

16. The compression tester adapter of claim 1, wherein the hose further comprises a flexible tube, including: a first hose end; a second hose end; and a hollow central passage including a first opening at the first hose end and a second opening at the second hose end configured to provide fluid communication between the first hose end and the second hose end, wherein the first hose end is attached to the plug fitting and the second hose end is connected to the connector fitting, providing uninterrupted sealed fluid communication between the plug fitting and the connector fitting.

17. The compression tester adapter of claim 1, wherein the hose further comprises at least one textile, metallic braid, and mesh reinforcement sleeve, wherein the braid or mesh is oriented on a bias.

18. The compression tester adapter of claim 1, further comprising: a compression pressure gauge; and a spark plug hose connected to the attachment interface and to the compression pressure gauge.

19. A compression tester adapter, comprising:
means for engaging a threaded spark plug socket in an internal combustion engine cylinder head;
means for attaching a compression tester spark plug hose;
flexible means for transmitting a compressed gas;
means for affixing the flexible means for transmitting to the means for engaging;
means for affixing the flexible means for transmitting to the means for attaching, wherein the means for engaging is configured to engage an internal thread configured with a nominal diameter of 12 millimeters; and
means for creating a substantially airtight seal against a periphery of a tapered seat near a inner extreme of the spark plug socket, the means for creating a substantially air tight seal located between the means for engaging and the means for attaching,
wherein the means for creating a substantially airtight seal is mounted to a cylinder portion having substantially the same diameter as a pilot segment.

20. A method of adapting a compression tester spark plug hose for use with a spark plug socket, comprising:
engaging a threaded spark plug socket in an internal combustion engine cylinder head;
attaching a compression tester spark plug hose;
transmitting a compressed gas to the compression tester spark plug hose, wherein the spark plug socket thread is configured with a nominal diameter of 12 millimeters; and
creating a substantially airtight seal using a gasket, against a periphery of a tapered seat near an inner extreme of the spark plug socket wherein the gasket is located on a cylinder portion having substantially the same diameter as a pilot segment between the thread and a cylinder segment of the socket.

* * * * *